United States Patent
Delerablee

(10) Patent No.: US 8,121,289 B2
(45) Date of Patent: Feb. 21, 2012

(54) CRYPTOGRAPHIC METHOD WITH INTEGRATED ENCRYPTION AND REVOCATION, SYSTEM, DEVICE AND PROGRAMS FOR IMPLEMENTING THIS METHOD

(75) Inventor: Cecile Delerablee, Caen (FR)

(73) Assignee: France Telecom, Paris (FR)

( * ) Notice: Subject to any disclaimer, the term of this patent is extended or adjusted under 35 U.S.C. 154(b) by 486 days.

(21) Appl. No.: 12/227,823

(22) PCT Filed: May 4, 2007

(86) PCT No.: PCT/FR2007/051214
§ 371 (c)(1), (2), (4) Date: Nov. 28, 2008

(87) PCT Pub. No.: WO2007/138204
PCT Pub. Date: Dec. 6, 2007

(65) Prior Publication Data
US 2009/0138704 A1 May 28, 2009

(30) Foreign Application Priority Data
May 31, 2006 (FR) .................................... 06 04853

(51) Int. Cl.
*H04L 9/08* (2006.01)
*H04L 9/16* (2006.01)
*H04L 29/06* (2006.01)

(52) U.S. Cl. ............ 380/44; 380/28; 380/277; 380/278; 713/158

(58) Field of Classification Search .................. 713/158; 380/28, 44, 277, 278
See application file for complete search history.

(56) References Cited

U.S. PATENT DOCUMENTS

| | | | | |
|---|---|---|---|---|
| 7,010,125 B2 * | 3/2006 | Lotspiech et al. | ............ | 380/242 |
| 7,039,803 B2 * | 5/2006 | Lotspiech et al. | ............ | 713/163 |
| 7,143,066 B2 * | 11/2006 | Shear et al. | ............ | 705/54 |
| 7,568,094 B2 * | 7/2009 | Matsushita | ............ | 713/155 |
| 7,634,087 B2 * | 12/2009 | Boneh et al. | ............ | 380/28 |
| 7,721,089 B2 * | 5/2010 | Gentry et al. | ............ | 713/163 |
| 2002/0141582 A1 * | 10/2002 | Kocher et al. | ............ | 380/201 |
| 2004/0128259 A1 * | 7/2004 | Blakeley et al. | ............ | 705/74 |
| 2006/0129805 A1 * | 6/2006 | Kim et al. | ............ | 713/158 |

OTHER PUBLICATIONS

Tzeng, Wen-Guey et al. "A Public-Key Traitor Tracing Scheme with Revocation Using Dynamic Shares", LNCS 1992, 2001.*
Boneh, Dan et al. "Fully Collusion Resistant Traitor Tracing with Short Ciphertexts and Private Keys", May 2006.*

* cited by examiner

*Primary Examiner* — Michael Simitoski
(74) *Attorney, Agent, or Firm* — McKenna Long & Aldridge LLP

(57) ABSTRACT

A first entity (1) includes a secret encryption key ($g_1$, $\gamma$) of an encryption diagram which can accept a plurality of encryption keys. A plurality of decoders have respective encryption keys, each incorporating a respective key index. The method comprises an encryption operation, wherein a value is taken as a variable element (s) and a ciphertext (C') is calculated from the data to be transmitted (K) and at least from the value taken as the variable element and the secret encryption key. An operation for revoking a decryption key is integrated into an encryption operation performed with a value of the variable element (s) based on the index key (x') of one of the decryption keys, which will be used during an operation for tracking illegitimate decoders.

20 Claims, 7 Drawing Sheets

US 8,121,289 B2

CRYPTOGRAPHIC METHOD WITH INTEGRATED ENCRYPTION AND REVOCATION, SYSTEM, DEVICE AND PROGRAMS FOR IMPLEMENTING THIS METHOD

This application is a 35 U.S.C. §371 National Stage entry of International Patent Application No. PCT/FR2007/051214, filed on May 4, 2007, and claims priority to French Application No. FR 0604853, filed on May 31, 2006, both of which are hereby incorporated by reference in their entireties.

BACKGROUND OF THE INVENTION

The present invention relates to the cryptographic techniques used, in particular, for protecting the broadcasting of content.

It applies in particular to the case where an entity (provider) wishes to broadcast a content on a public channel that is unprotected so that only legitimate users are capable of accessing this content. The legitimate users are for example those who have paid for access rights. The provider wants the content to be kept confidential from illegitimate users, which requires the use of a particular encryption scheme accepting, for one and the same encryption key, a plurality of different but equivalent decryption keys. Each key is initially entered in the memory of a decryption device such as a decoder provided to each legitimate user.

In this context, it is desirable to prevent or discourage the manufacture of illegitimate (pirate) decoders, and the broadcasting of illegitimate keys, on the Internet network for example. When a user obtains such a key or such an illegitimate decoder, it is useful to have a means making it possible to determine the identity of at least one legitimate user (traitor) having contributed to producing it. This capability is called traceability.

Another useful operation in this context of application of cryptography is that consisting in revoking the decryption keys of certain users. It allows the provider to disable certain decryption keys of his choice. A disabled (or revoked) key cannot be used to correctly decrypt an encrypted content after revocation.

In a typical application, the provider or broadcaster encrypts the content with the aid of a symmetric session key K of relatively small size, then broadcasts this encrypted content accompanied by a cryptogram transporting an encrypted version of the session key K. Each user then uses his decryption key suitable for recovering the session key K, then uses this key K in order to decrypt the broadcast content. The session key K is renewed at regular time intervals, for example of the order of a few seconds, so that its publication in real time is too constricting for the pirates. All the technical difficulty therefore resides in the design of a safe method (encryption scheme) in order to encrypt the session key K, accepting multiple equivalent decryption keys.

The known methods for responding to this need have a certain limitations. In particular, the encryption procedure usually requires prior knowledge of the group of legitimate users, which greatly complicates the management thereof in the applications where the legitimate users may be extremely numerous.

A particularly marked disadvantage is that the size of the cryptogram transporting the session key grows with the number of legitimate users. If n is the number of legitimate users, most of the known solutions produce a cryptogram of a size proportional to n. Even the best known solution, according to the Cryptology ePrint article "Fully Collusion Resistant Traitor Tracing With Short Ciphertexts and Private Keys" by D. Boneh, A. Sahai and B. Waters, available on the Internet, imposes a cryptogram of a size proportional to $\sqrt{n}$.

Certain encryption schemes are only partially traceable, in the sense that the analysis of a pirate decoder or an illegitimate key will not make it possible to determine one of the traitors at the origin of its design unless the number of traitors is less than a threshold number smaller than n. In this case, the higher the threshold k, the less effective (in terms of size of the cryptogram and/or size of the decryption keys) are these schemes.

Other schemes, as in the article "New Traitor Tracing Schemes Using Bilinear Map", by To, Safavi-Naini and Zhang (DRM'03), are not resistant to certain attacks, which make them untraceable.

In certain encryption schemes, the size of the decryption keys is very large, which makes these solutions unusable in practice, particularly in embedded environments, such as for example mobile telephones, which have only small memory and/or computing capabilities.

Most of the existing schemes are not compatible with the "Black Box" model. In this model, the functionality of traceability operating on a pirate decoder does not require the logical or physical disassembly of the decoder, but can on the contrary identify a traitor from simple executions of the decoder. Therefore, this model is particularly relevant when the pirate decoder is a program that can be executed partially or totally obfuscated in order to hide the decryption key that it uses.

Certain encryption schemes do not allow the revocation of keys, which forces the broadcaster to renew all the decryption keys with the legitimate users at regular time intervals.

Other schemes (such as in "A public-key traitor tracing scheme with revocation using dynamic shares" by Wen-Guey Tzeng and Zhi-Jia Tzeng, PKC 2001) allow the revocation of keys, but provide for the broadcasting of the decryption keys to be revoked, which makes the revocation permanent. For applications such as the broadcasting of pay television channels, it may be necessary to revoke decryption keys only for the broadcasting of certain programs. It is therefore required that this revocation does not reveal the decryption keys to be revoked, so that they can be usable again for the broadcasting of other programs for example.

Certain schemes such as in "Revocation and Tracing Schemes for Stateless Receivers" by Naor et al (Crypto 2001) provide that the decryption keys are of inconstant size, depending on the total number of users, and having certain portions in common with one another. Therefore, the memory space necessary on the receiver side must be fairly large.

Relating to the broadcasting of content on mobile telephones (applications called mobile TV), the limitations in terms of memory space and computing time are such that there is currently no solution that can be traced, even partially, or that can be revoked. The current technique assigns the same decryption key to all the users, which is not protective for the providers since a traitor-user who manages to find out his key, and who for example broadcasts it on the Internet, cannot be identified.

There is therefore a need for an encryption/decryption method which provides both traceability and revocability, while minimizing the costs for the content broadcaster and the users.

SUMMARY OF THE INVENTION

The invention proposes a cryptographic method, wherein a first entity has a secret encryption key of an encryption scheme accepting a plurality of decryption keys, and a plurality of receiving entities have respective decryption keys, each decryption key incorporating a respective key index. The method comprises an encryption operation comprising the steps of:

assigning a value to at least one variable element; and computing a cryptogram from data to be transmitted and from at least each variable element value, and the secret encryption key, said cryptogram comprising an element enabling decryption of said data to be transmitted, said cryptogram being for transmission to said receiving entities.

The method further comprises a revocation operation for at least one decryption key incorporated in an encryption operation carried out by assigning to said at least one variable element a value depending on the key index of said at least one decryption key, in order to prevent decryption of said data to be transmitted by the receiving entity holding said at least one decryption key to be revoked, the transmitted cryptogram comprising a portion of said at least one decryption key.

This revocation does not require the broadcasting of the decryption keys to be revoked, but a portion of the keys only, which makes this operation reversible.

The method procures an effective encryption scheme, resistant to maximum coalitions. It accepts a large number of traceable and revocable decryption keys. In addition, the sizes of the cryptogram and of the keys may be constant and independent of the number of users.

The encryption procedure is made independent of the keys provided to the legitimate users, which greatly reduces the work of the entity that broadcasts the content.

Remarkably, the size of the cryptogram may be made constant and independent of the number of users n. The keys employed may also be very small and of constant size (independent of the number of users or of the size of an "authorized" coalition). This property is well suited to a software implementation, for example on smart cards or mobile telephones.

The invention makes it possible to perform so-called "black box" tracing, i.e. not requiring any hardware disassembly of the pirate decoder or software disassembly of the program that it contains.

The method also offers a possibility of revocation of keys. If, for example, a user has acted badly (detected to be a pirate) or if his subscription is no longer valid, his key may be revoked so that this user (and any pirate decoders originating from the latter) can no longer decrypt the content that is broadcast subsequently.

In an embodiment, recovery of the data to be transmitted at a receiving entity comprises an operation of decryption of the cryptogram, which is prevented when the decryption key of this receiving entity is revoked in an encryption operation, which modifies the behavior of this entity because it is no longer capable of restoring the data effectively sent. This modification of behavior is used in the tracing procedure, in which a tracing device controlled by the broadcaster is connected with a suspect decoder and successively revokes the keys of the suspected users, or, if necessary, of all the users.

Preferably, at least certain of the revocation operations further include, at the first entity, an update of at least one parameter involved in the computation of the cryptogram for a subsequent encryption operation. After a revocation operation, a decryption operation may further include, at a receiving entity other than the entity whose decryption key is revoked, an update of at least one element of the decryption key of this entity.

In one advantageous embodiment, every N encryption operations, the encryption operation includes a decryption key revocation operation, N being an integer greater than or equal to 1. Such an embodiment allows resistance to so-called "stateful" decoders, i.e. capable of realizing that they are subjected to a tracing procedure, because the tracing procedure cannot be distinguished by a decoder from the "normal" procedure of encryption. Tracing is still possible, because a decoder cannot be aware that it is being tested by an authority while its own key (or one of the keys having been used for its production) has not been revoked, this revocation causing a modification of its behavior, making it possible to detect the traitor.

In a particular embodiment, the secret encryption key includes an element $g_1$ of a cyclic group $G_1$ of order p and an integer $\gamma$ chosen between 1 and p−1, where p is a prime number. The secret encryption key is then associated with a public key w of a cyclic group $G_2$ of order p, in the form $w=g_2^\gamma$, where $g_2$ is an element of group $G_2$, and each decryption key having an integer index x lying between 1 and p−1 includes two elements $A=g_1^{1/(\gamma+x)}$ and $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

In this case, the cryptogram advantageously comprises portions representative:

of the element $C_1=h_1^{1/(\gamma+s)}$ of group $G_1$, where is the value assigned to a variable element, taken as an integer lying between 1 and p−1;

of the value $C_2=s$ of said variable element;

of the element $C_3=w^k$ of group $G_2$, where k is an integer lying between 1 and p−1;

of the element $C_4=h_2^{k/(\gamma+s)}$ of group $G_2$, $h_2$ being a generator element of group $G_2$ such that $g_2=h_2^\alpha$; and of a value $C_5$ derived from the data to be transmitted (K) and from a masking value (R) obtained by subjecting the elements $g_1$ and $C_4$ of groups $G_1$ and $G_2$ to a bilinear application.

At least one revocation operation then includes, after computation of element $C_1$ with the value s of said variable element equal to the index x' of the revoked decryption key, replacing said element $h_1$ of group $G_1$ by $h_1^{1/(\gamma+x')}$ and, after computation of element $C_4$ with the value s of said variable element equal to the index x' of the revoked decryption key, replacing said element $h_2$ of group $G_2$ by $h_2^{1/(\gamma+x')}$ for computation of the cryptogram in a subsequent encryption operation. Thus, the cryptogram obtained contains a portion of the decryption key to be revoked (B, x) and not the whole decryption key (A, B, x) which makes the revocation reversible. The operation of decrypting the cryptogram to recover the data to be transmitted at a receiving entity having a decryption key {A, B, x} includes computing an element $Y=(C_1/B)^{1/(x-C_2)}$ of group $G_1$, computing a first value by subjecting the elements Y and $C_3$ of groups $G_1$ and $G_2$ to the bilinear application, computing a second value by subjecting the elements $A^x$ and $C_4$ of groups $G_1$ and $G_2$ to the bilinear application, computing a third value, representative of the masking value, equal to the product of said first and second values, and recovering the data to be transmitted (K) from the value $C_5$ and said third value.

The whole number k may be drawn randomly between 1 and p−1 on each encryption operation. Another possibility is to take k to be constant, particularly k=1 in which case the element $C_3=w$ does not need to be transmitted.

In a simplified embodiment, the group $G_2$ is identical to the group $G_1$ and the elements $h_1$ and $h_2$ are equal.

The method according to the invention also makes it possible to carry out the encryption with the aid of a public key supplied by the first entity. The computation of the cryptogram in the encryption operation then comprises a first portion executed by the first entity in order to produce a public encryption key from at least said value of the variable element and the secret encryption key, and at least one occurrence of a second portion executed by another entity in order to produce the cryptogram from the data to be transmitted, the public encryption key and at least a number drawn randomly on each occurrence.

Another aspect of the present invention relates to an encryption system comprising: a memory for containing a secret encryption key of an encryption scheme accepting a plurality of respective decryption keys, each decryption key incorporating a respective key index; and a computer arranged to assign a value to at least one variable element in an encryption operation and to produce a masking value from at least each variable element value and the secret encryption key. The computer is controlled, when the encryption operation includes an operation to revoke at least one decryption key, to assign to at least one variable element a value that is a function of the key index of said at least one decryption key.

Another aspect of the present invention relates to a computer program for an encryption system, comprising instructions to carry out the encryption and revocation operations of a method as defined above upon execution of the program by a processor unit of the encryption system.

Another aspect of the present invention relates to a tracing device for examining a pirate decoder, the device comprising an interface for communication with the pirate decoder, an encryption system as defined hereinabove arranged to deliver to the pirate decoder, through the communication interface, cryptograms produced in successive encryption operations and means for observing a behavior of the pirate decoder in response to the successive cryptograms. The encryption system is controlled such that the successive encryption operations comprise operations of revocation of the decryption keys allocated to respective decoders.

Yet another aspect of the present invention relates to a decryption device comprising:
  a memory to contain a decryption key of an encryption scheme accepting a plurality of decryption keys associated with one and the same secret encryption key, each decryption key incorporating a respective key index; and
  a computer to receive a cryptogram generated in an encryption operation from data to be transmitted and from at least one value assigned to at least one variable element and the secret encryption key and to restore said data with the aid of the decryption key contained in said memory.

The computer is arranged to update at least one element of the decryption key contained in the memory after an operation of revocation of the decryption key incorporated in an encryption operation carried out by assigning to a variable element a value that is a function of the index of the key of one of the decryption keys. Recovery of the data and update of the element of the decryption key are prevented when the key index as a function of which the value of the variable element is taken in the revocation operation coincides with the index of the decryption key contained in the memory.

This device may in particular be adapted to decrypt a cryptogram produced by an encryption system according to the invention and comprising the elements $C_1, C_2, C_3, C_4$ and $C_5$ listed hereinabove, by means of the computation of an element $Y=(C_1/B)^{1/(\alpha-C_2)}$ of group $G_1$, of a first value by subjecting the elements Y and $w^k$ of groups $G_1$ and $G_2$ to the bilinear application, of a second value by subjecting the elements $A^x$ and $C_4$ of groups $G_1$ and $G_2$ to the bilinear application, and of a third value equal to a product of said first and second values. The data to be transmitted are recovered by the device from the value $C_5$ and said third value. If we are in the case where k=1 during the encryption, the element $C_3$=w is not necessarily included in the cryptogram received. The invention also proposes a computer program suitable for a software version of such a decryption device.

BRIEF DESCRIPTION OF THE DRAWINGS

Other features and advantages of the present invention will appear in the following nonlimiting exemplary embodiments, with reference to the appended drawings in which.

DESCRIPTION OF THE PREFERRED EMBODIMENTS

The invention is described below in its nonlimiting application to the broadcasting of encrypted content.

Figure 1:
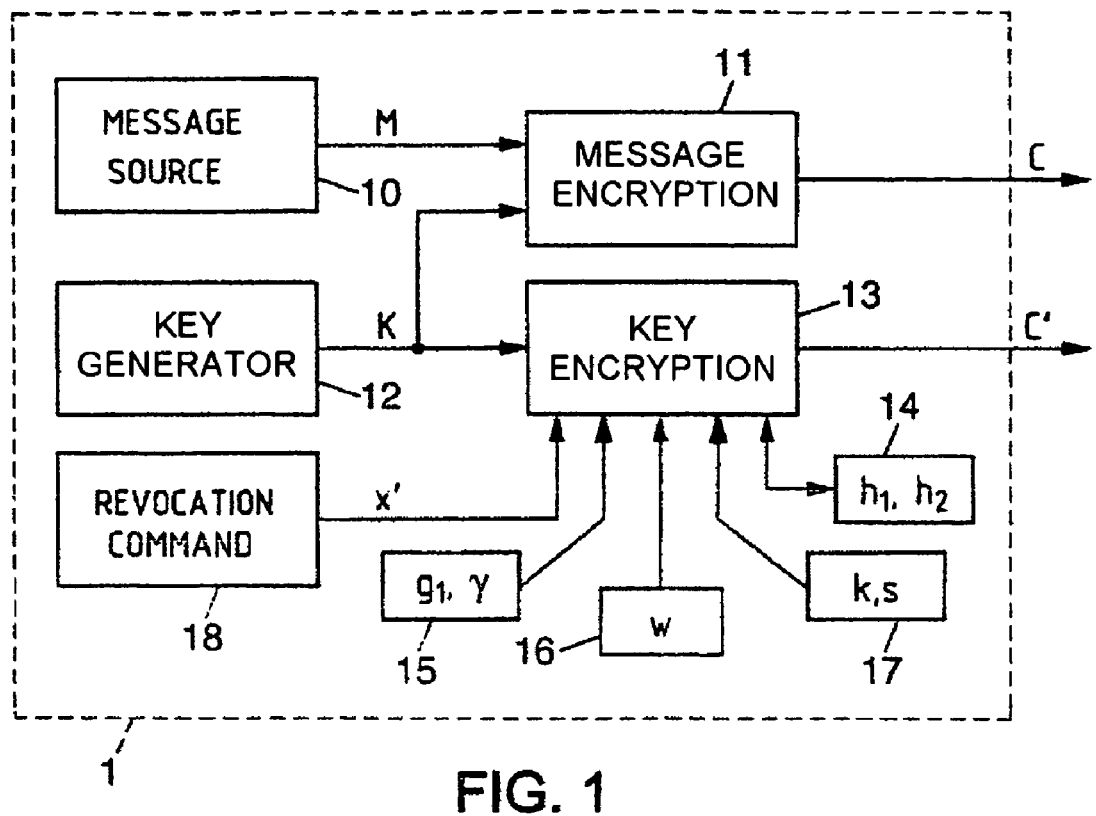
FIG. 1 is a block diagram of an example of an encryption system according to the invention.

The entity 1 represented in FIG. 1 is, in this application, controlled by a content provider or broadcaster, and it comprises a source 10 of messages M consisting for example in encoded audio and/or video content. The messages M are encrypted by a module 11 with the aid of a symmetric encryption key K belonging to a set E and produced by a random generator 12. The cryptogram resulting from the encryption of a message M by means of the key K is denoted by C.

The symmetric encryption key K is itself encrypted in a cryptogram C' by a computation module 13 by applying a method according to the invention.

The method according to the invention is for example applicable to access control for pay television channels. The content can then be constantly decrypted by the legitimate (not revoked) decoders, and the key contained in a decoder is updated as and when keys are revoked. In case of prolonged disconnection, a synchronization phase may be provided if necessary, during which the key of the decoder will be updated (according to the parameter changes that have taken place between the disconnection and the reconnection).

It is also applicable to the field of video on demand (VOD), wherein the users buy a temporary entitlement to decrypt an encrypted broadcasted content. In this case, the user connects in order to obtain a decryption key (or an update of an existing key), which will be revoked at the end of the period provided by the purchase of the service. A reverse channel will then be used, just on initialization, in order to authenticate the customer and/or in order to pay for the service. During the authorized decryption period, the decryption key may be updated according to the parameter change due to any revocations.

In the nonlimiting example considered here, the encryption uses a scheme based on the following mathematical environment. Two cyclic groups $G_1$ and $G_2$ are defined, each of order p, where p is a prime number, typically having a representation in base 2 of more than one hundred bits. A bilinear application e from $G_1 \times G_2$ to another cyclic group $G_T$ is also defined. A possible example for such bilinear application e is the Tate coupling. $h_1$ and $h_2$ are two respective generator elements of groups $G_1$ and $G_2$, stored in a memory 14 of the entity 1. This memory 14 can be accessed in read and write mode by the encryption module 13. It is not essential for its access operations to be protected.

For the masking of the key K to be transmitted, a (public) key derivation mechanism is used, consisting in an application D from $E \times G_T$ to E accepting a inverse application $D^{-1}$ from $E \times G_T$ to E. If R indicates a masking value computed in group $G_T$, the cryptogram C' will include a portion representative of a value $C_5 = D(K, R)$, from which a decoder having reconstituted the masking value R can recover the key $K = D^{-1}(C_5, R)$. A possible example consists in taking $D(K, R) = K \oplus H(R)$, where H is a hash function with values in E, i.e. with the same number of bits as the keys K, and $\oplus$ indicates the bitwise EXCLUSIVE OR operation. This application D is equal to its inverse application $D^{-1}$.

The secret key of the broadcaster is stored in a memory 15 of the entity 1, accessible in read mode only and in a protected manner. It comprises an element $g_1$ of the group $G_1$ and a whole number $\gamma$ lying between 1 and p-1. The whole number lying between 1 and p-1 is marked a such as $g_1 = h_1^{\alpha}$. This secret key is associated with a public key w, stored in a memory 16, consisting in an element of group $G_2$ such as $w = g_2^{\gamma}$, where $g_2 = h_2^{\alpha}$.

The decryption key provided by the broadcaster to a decoder is chosen as a solution to a difficult problem such as for example the q-SDH problem ("q-Strong Diffie-Hellman"). Such a key $\{A, B, x\}$ comprises an integer index x lying between 1 and p-1 and two elements A, B of group $G_1$ defined by $A = g_1^{1/(\gamma+x)}$ and $B = h_1^{1/(\gamma+x)}$. For a given decoder, the parameters A and x of the decryption key are invariable, while the element B (as well as $h_1$) changes when key revocations take place, as will be seen below. The indices x of the keys in circulation are known to the broadcaster.

Figure 3:
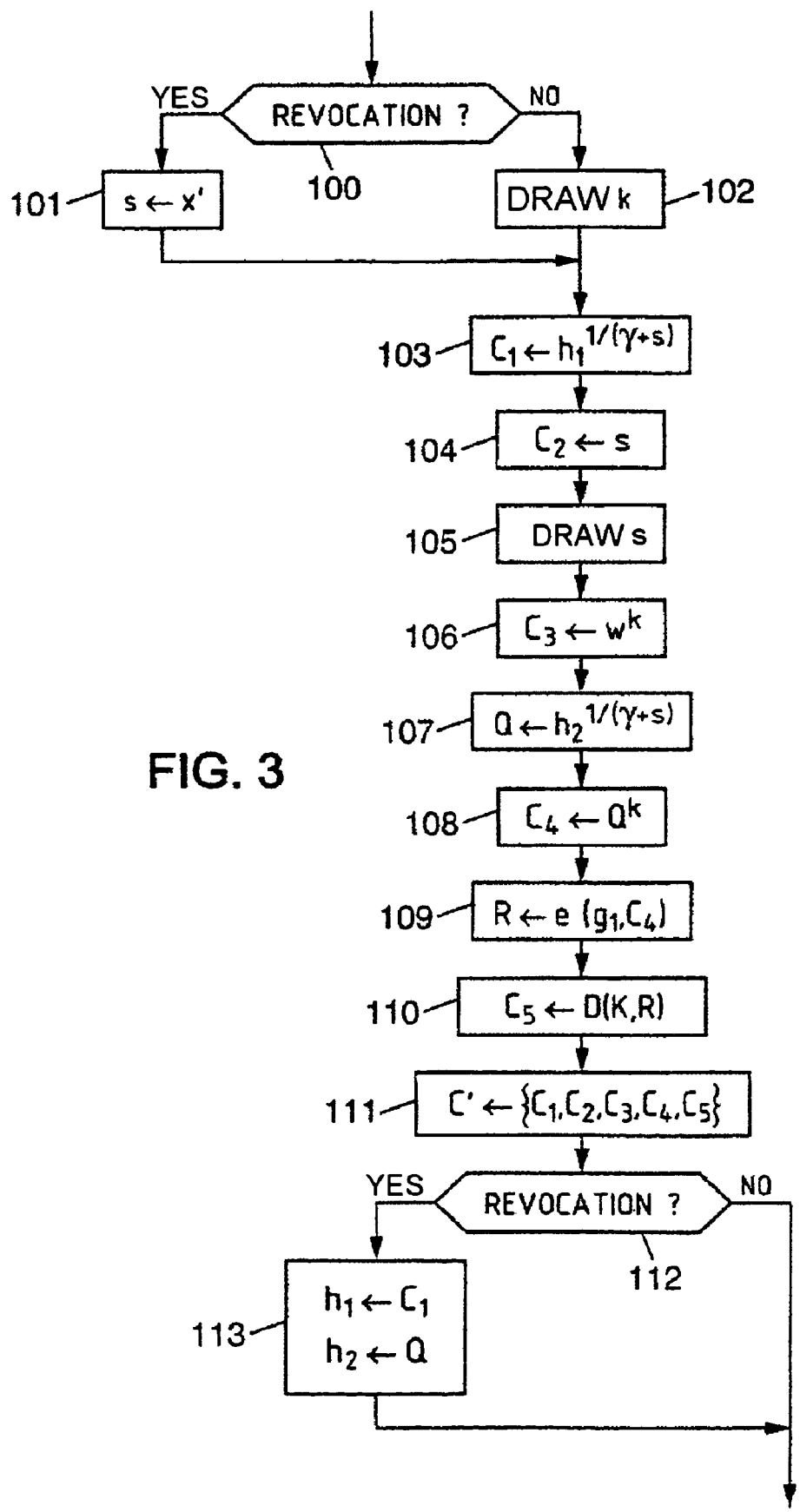
FIGS. 3 and 4 are flowcharts of encryption and decryption operations respectively usable in a system such as that of FIG. 1, and in a device such as that of FIG. 2.

In the embodiment considered with reference to FIG. 3, the encryption of a session key K by the entity 1 involves two whole numbers k and s taken randomly between 1 and p-1, produced by a random number generator 17.

When the encryption is accompanied by the revocation of one of the decryption keys $\{A', B', x'\}$, the number s is not drawn at random but taken to be equal to the index x' of the revoked key. In the architecture illustrated by FIG. 1, the module 18 supplies the revocation commands by indicating the index x' of the key to be revoked.

FIG. 3 shows the computations and logical processes carried out by the module 13 for the encryption of a session key K. If the module 18 has commanded a revocation of a key of index x' (test 100), the value of the integer index x' is assigned to the integer s in step 101. Otherwise, the value of s is drawn at random in step 102.

The module 13 then computes the element $C_1 = h_1^{1/(\gamma+s)}$ of group $G_1$ in step 103, and it assigns the value of the integer s to the element $C_2$ in step 104. The number k is drawn at random between 1 and p-1 in step 105, and the module 13 computes the element $C_3 = w^k$ of group $G_2$ in step 106. The module 13 also obtains the element $C_4 = h_2^{k/(\gamma+s)}$ of group $G_2$, for example by computing $Q = h_2^{k/(\gamma+s)}$ in step 107 and then $C_4 = Q^k$ in step 108. The masking value R may then be computed in step 109, according to the formula: $R = e(g_1, C_4)$.

After having obtained the value $C_5 = D(K, R)$ in step 110, the module 13 composes the cryptogram $C' = \{C_1, C_2, C_3, C_4, C_5\}$ in step 111 so that it is broadcast jointly with the cryptogram C. This terminates the encryption operation if it involves no decryption key revocation.

If, on the other hand, the module 18 has a key of index x' revoked (test 112), the entity 1 updates the values of the generator elements $h_1$ and $h_2$ of groups $G_1$ and $G_2$, while replacing $h_1$ with $C_1 = h_1^{1/(\gamma+x')}$ and $h_2$ with $Q = h_2^{1/(\gamma+x')}$. Note that this update does not affect the values $g_1$ and $\gamma$ constituting the secret key of the broadcaster.

Figure 2:
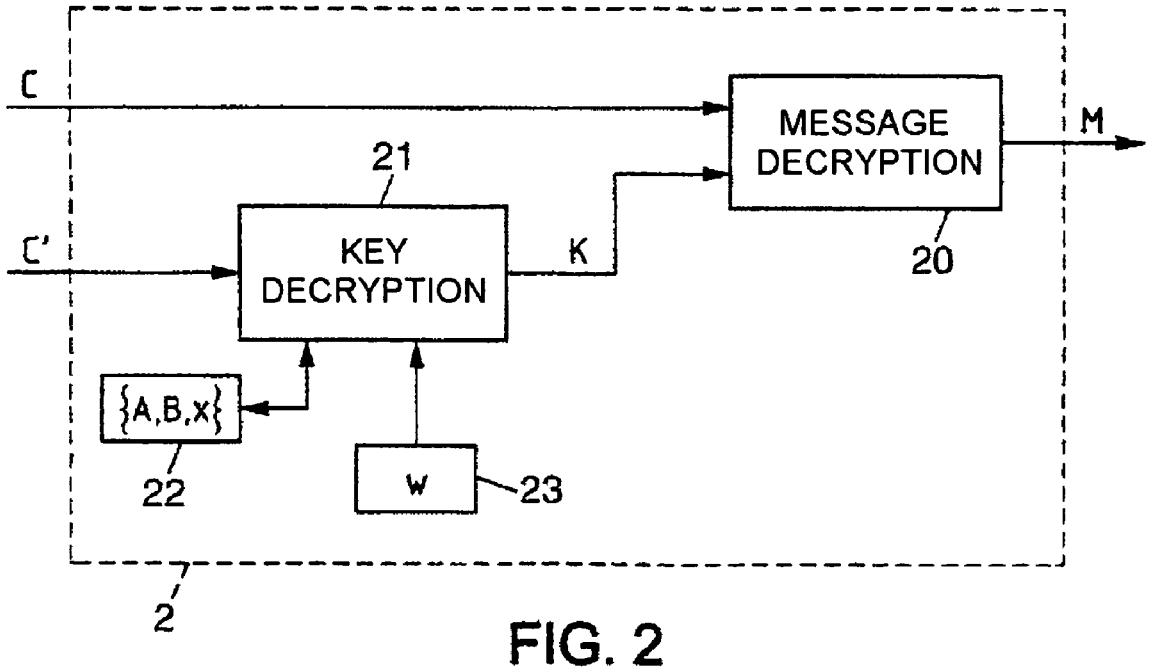
FIG. 2 is a block diagram of an example of a decryption device adapted to the encryption system of FIG. 1.

With reference to FIG. 2, a receiving entity (decoder) 2 comprises a module 20 to decrypt the cryptograms C' and restore the messages M, with the aid of the symmetric key K. The latter is recovered by a key decryption module 21 receiving the cryptogram C' and interacting with a memory 22 where the decryption key $\{A, B, x\}$ allocated to the decoder is stored and if necessary with a memory 23 where the public key w of the broadcaster is stored.

The memory 22 containing the key $\{A, B, x\}$ belongs to a protected portion of the decoder, for example to a smart card, like the computing module 21, which prevents access to the confidential parameters. The module 20 for decrypting the content with the aid of K may for its part be found in another portion of the decoder 2.

Figure 4:
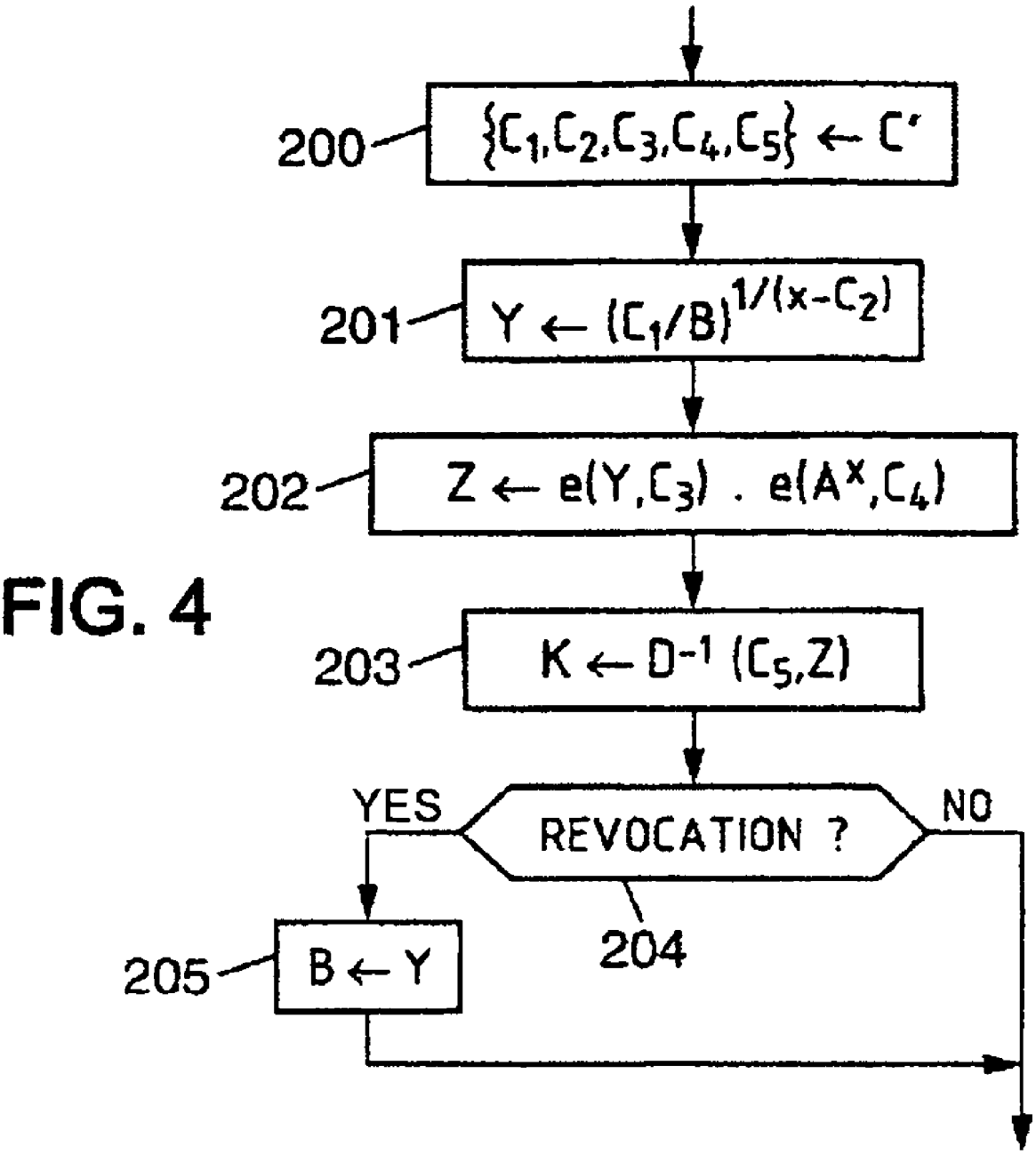

The decryption of the cryptogram C' by module 21 of the decoder 2 may be carried out according to the procedure illustrated by FIG. 4 when this cryptogram C' has been constructed according to FIG. 3. After recovery of the parameters $C_1$-$C_5$ of the cryptogram C' in step 200, the decryption module 21 computes the element $Y = (C_1/B)^{1/(x-C_2)}$ of group $G_1$ in step 201. It can be seen that this computation is impossible because of an indetermination when the cryptogram C' has been constructed in an operation of revocation of the key $\{A, B, x\}$ of the considered decoder ($C_2 = x$).

In step 202, the module 21 uses the bilinear application e in order to compute two values $Z_1 = e(Y, C_3)$ and $Z_2 = e(A^x, C_4)$, which are then multiplied together in order to produce another value $Z = Z_1 \cdot Z_2$ of group $G_T$. It can be verified that, if the decryption key $\{A, B, x\}$ of the decoder 2 has not been revoked, this value Z is equal to the masking value R involved in the encryption operation. The decoder may then recover the session key $K = D^{-1}(C_5, Z)$ in step 203.

If a decryption key of index x' has been revoked during the formation of the cryptogram received C' (test 204), it remains to the decoder 2 to update the parameter B of its decryption key, which is carried out by the module 21 in step 205 by substituting for B the value $Y = (C_1/B)^{1/(x-C_2)}$ obtained in step 201. It is possible to verify that, because of the updating of $h_1$ by the first entity 1 in step 113, the new value of B remains equal to $h_1^{1/(\gamma+x)}$. It is also possible to verify that the decoder whose key $\{A', B', x'\}$ has been revoked is not able to carry out the update 205.

To signal to the legitimate decoders that a decryption key revocation is incorporated into the current encryption, and therefore that an update of B must occur, the entity 1 may for example insert into the cryptogram C' (or even in a header of the message M) a specific signaling bit. The value of this bit indicates whether the decryption key of a decoder is being revoked (1) or not (0), and is examined in step 204 by the decoders. Other means of signaling revocations are also possible.

Furthermore, such a signaling is not always necessary. In one embodiment of the method, an update of the parameters $h_1$, $h_2$ is carried out by the broadcaster in each encryption operation, which amounts to saying that each encryption operation includes a decryption key revocation operation, whether or not it involves a key that is effectively allocated to a decoder. In this case, test 112 of FIG. 3 is bypassed and step 113 systematically executed. Correlatively, the computing module 21 of the decoder bypasses test 204 of FIG. 4 and systematically executes step 205. The advantage of such an embodiment is that it makes it impossible for the decoders to detect that the key of another decoder is being revoked.

In other words, a decoder cannot be "stateful" while its own key is not revoked. It should be noted that this very worthwhile property will not always be used by the broadcasters if security according to the "black box" model is sufficient and if a minimal complexity of the encryption/decryption procedure is sought.

Alternatively, the broadcaster may carry out a decryption key revocation operation (whether or not the key is allocated to a decoder) every N encryption operations, the integer N>1 being agreed in advance with the decoders. Steps 113 and 205 are then executed automatically every N times without it being necessary to signal the revocation operations to the decoders. The previously described embodiment corresponds to the case where N=1.

The embodiment illustrated by FIGS. 3 and 4 may be modified in various ways without departing from the context of the invention. In particular, rather than drawing at random the integer k, the latter may be taken to be equal to 1 in each encryption operation. This simplifies certain computations, and in this case the element $C_3$=w does not need to be incorporated into the cryptogram C' since it is already known to the decoders.

In another alternative embodiment, the cyclic groups $G_1$ and $G_2$ coincides, and one takes $h_1$=$h_2$ (and therefore also $g_1$=$g_2$).

Figure 5:
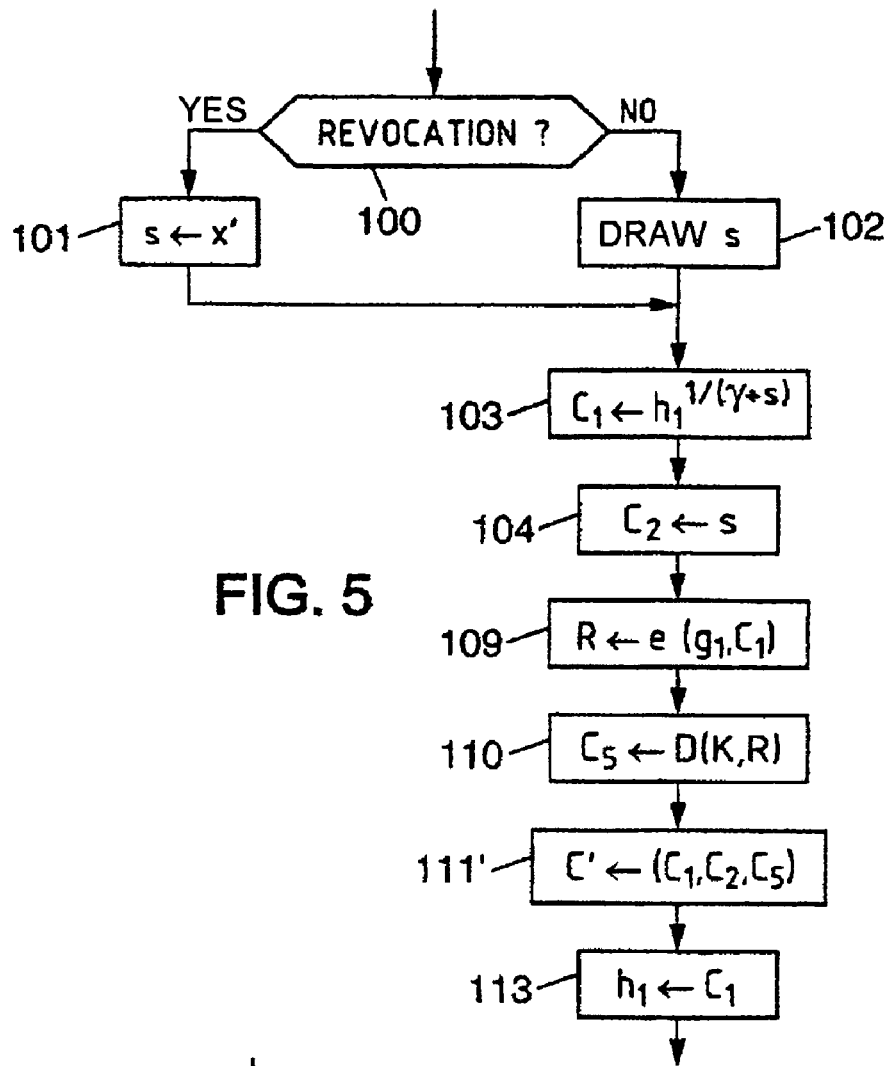
FIGS. 5 and 6 are flowcharts of simplified variants of encryption and decryption operations.
Figure 6:
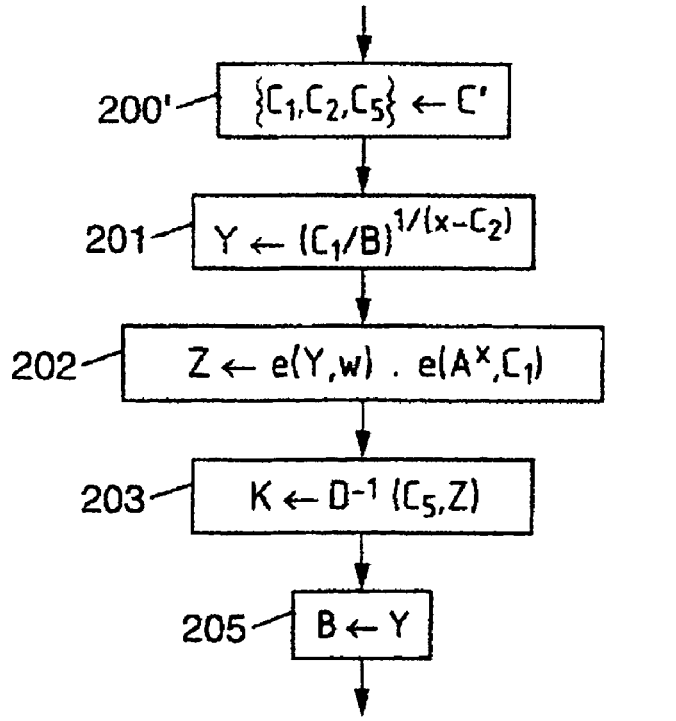

A simplified embodiment where k=1, $G_1$=$G_2$ and $h_1$=$h_2$ is illustrated in FIGS. 5 and 6 in the particular case in which each encryption operation includes a revocation operation (N=1). Steps 100-104 and 109-110 of FIG. 5 are identical to those of FIG. 3, steps 105-108 not being necessary in this case (k=1, $C_3$=w, $C_4$=Q=$C_1$). It is sufficient to include the elements $C_1$, $C_2$ and $C_5$ in the cryptogram C' in step 111'. In addition, step 113 for updating the parameter $h_1$=$h_2$ is carried out systematically at the end of processing by the module 13. The elements $C_1$, $C_2$ and $C_5$ are recovered in step 200' by the computing module 21 of the decoder, which then proceeds to steps 201, 202, 203 and 205 previously described with reference to FIG. 4 (with $C_3$=w and $C_4$=$C_1$).

A tracing device that can be used to examine a pirate decoder essentially consists in an encryption system similar to the entity 1 described with reference to FIG. 1, which is placed in communication with the pirate decoder, the cryptograms C, C' not being broadcast to the legitimate users. The encryption system of the tracing device delivers to the pirate decoder, via the appropriate communication interface, cryptograms C' produced in successive encryption operations. The module 18 controls the encryption module so that the decryption keys of the suspected decoders are successively revoked. The totality of the legitimate users, or certain of them only, may in principle be suspected. In response to these successive revocation operations, the pirate decoder will adopt the regular behavior (correct decoding of the messages M) until the decryption key from which it has been constructed is revoked. At this moment, its inability to decode the content M will reveal the identity x' of the traitor. If the pirate decoder employs a combination of several keys of legitimate decoders, the latter may be identified successively by the tracing procedure.

Figure 7A:
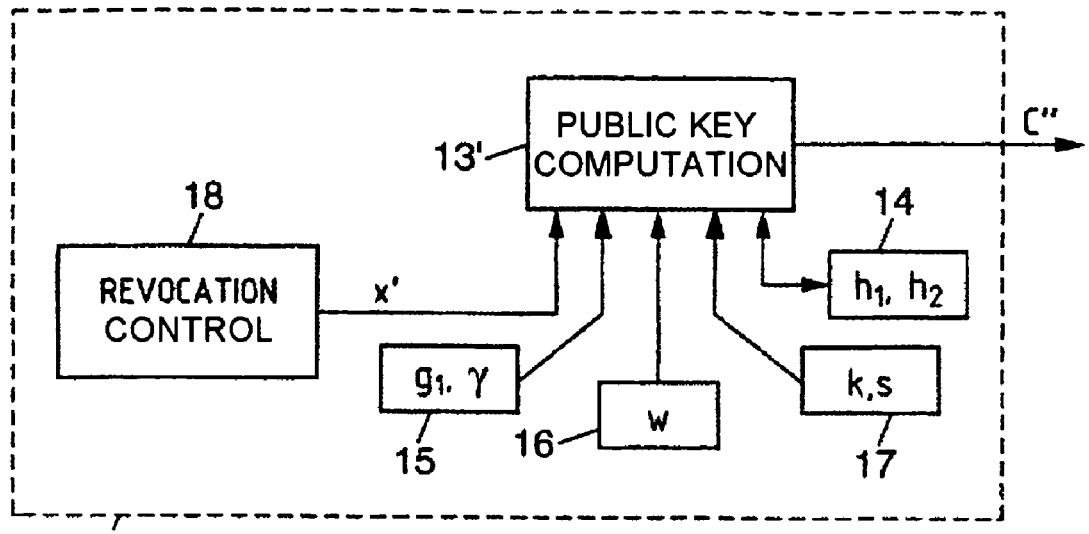
FIGS. 7A and 7B are block diagrams of first and second entities forming another embodiment of a system according to the invention.
Figure 7B:
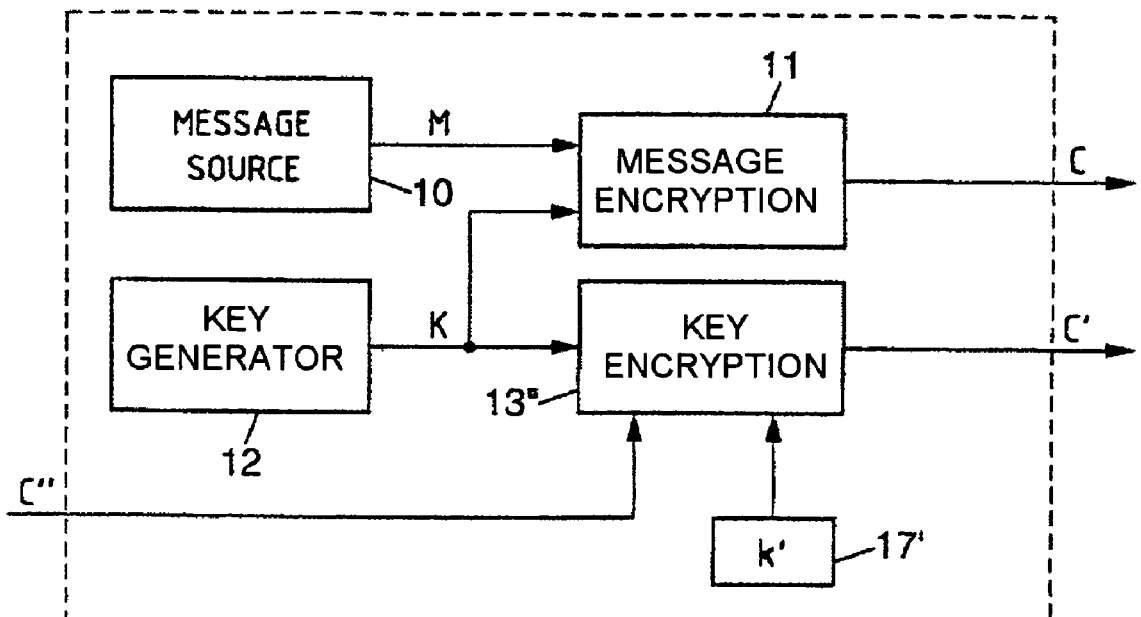

The cryptographic method described above is compatible with a public encryption key architecture as illustrated by FIGS. 7A and 7B.

In this case, the entity 3 which supervises the control of access to the content M delivers a public key C" which a second entity 4 uses for the actual encryption of the keys K.

The first entity 3 comprises a computing module 13' which operates in a similar manner to the computing module 13 of FIG. 1 (steps 100-109 and 112-113 of FIG. 8A identical to those of FIG. 2) but which, in step 111", replaces the value $C_5$ with the masking value R=e($g_1$, $h_2^{k/(\gamma+s)}$) in order to form the public key C"={$C_1$, $C_2$, $C_3$, $C_4$, R}.

The second entity 4 comprises the message source 10, the session key generator 12, the message encryption module 11 and a modified key encryption module 13" operating with a generator 17' of random numbers k' in order to produce the cryptogram C' attached to the cryptogram C produced by the module 11.

Figure 8A:
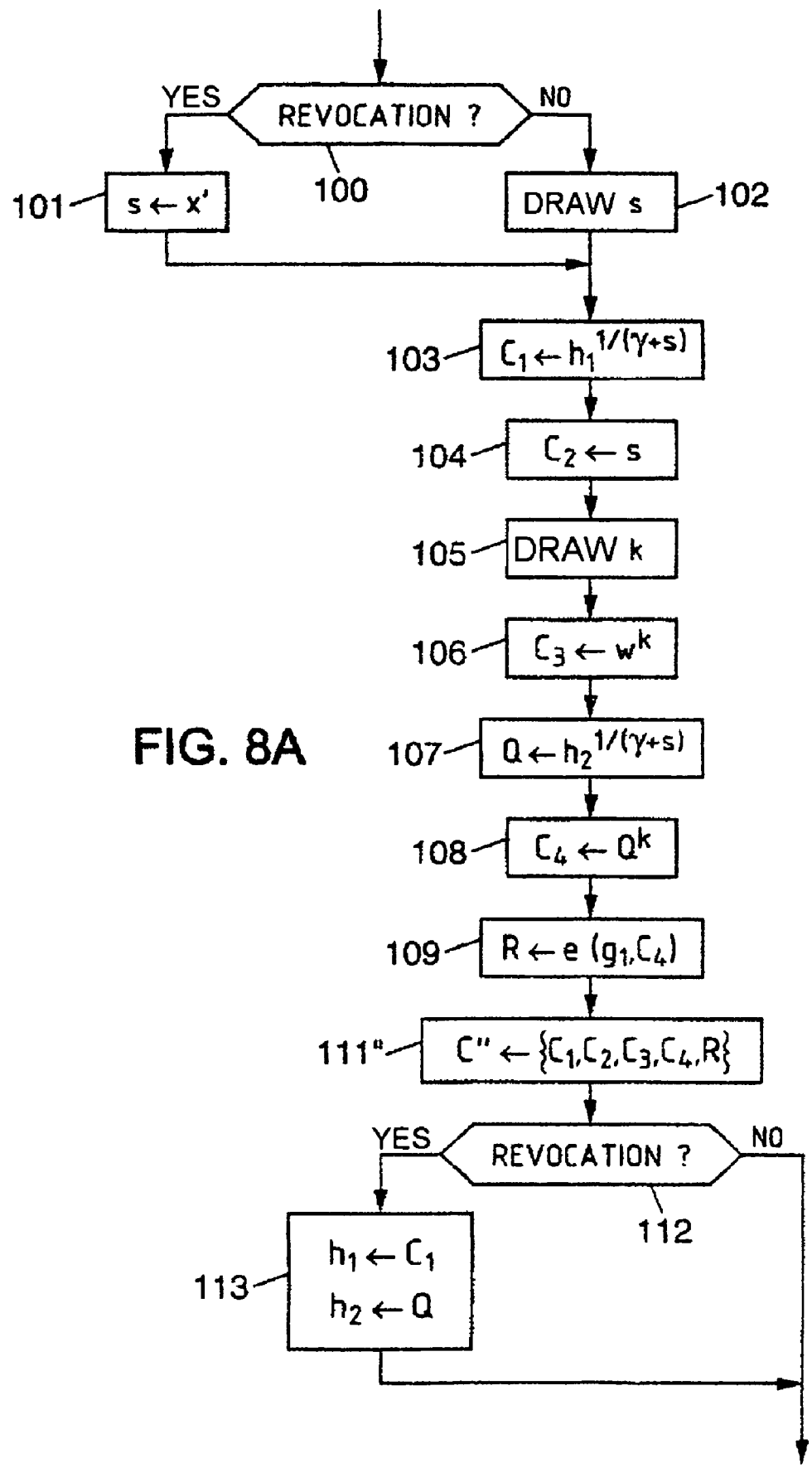
FIGS. 8A and 8B are flowcharts of an example of the encryption procedure according to the invention, distributed between the first and second entities of FIGS. 7A and 7B.
Figure 8B:
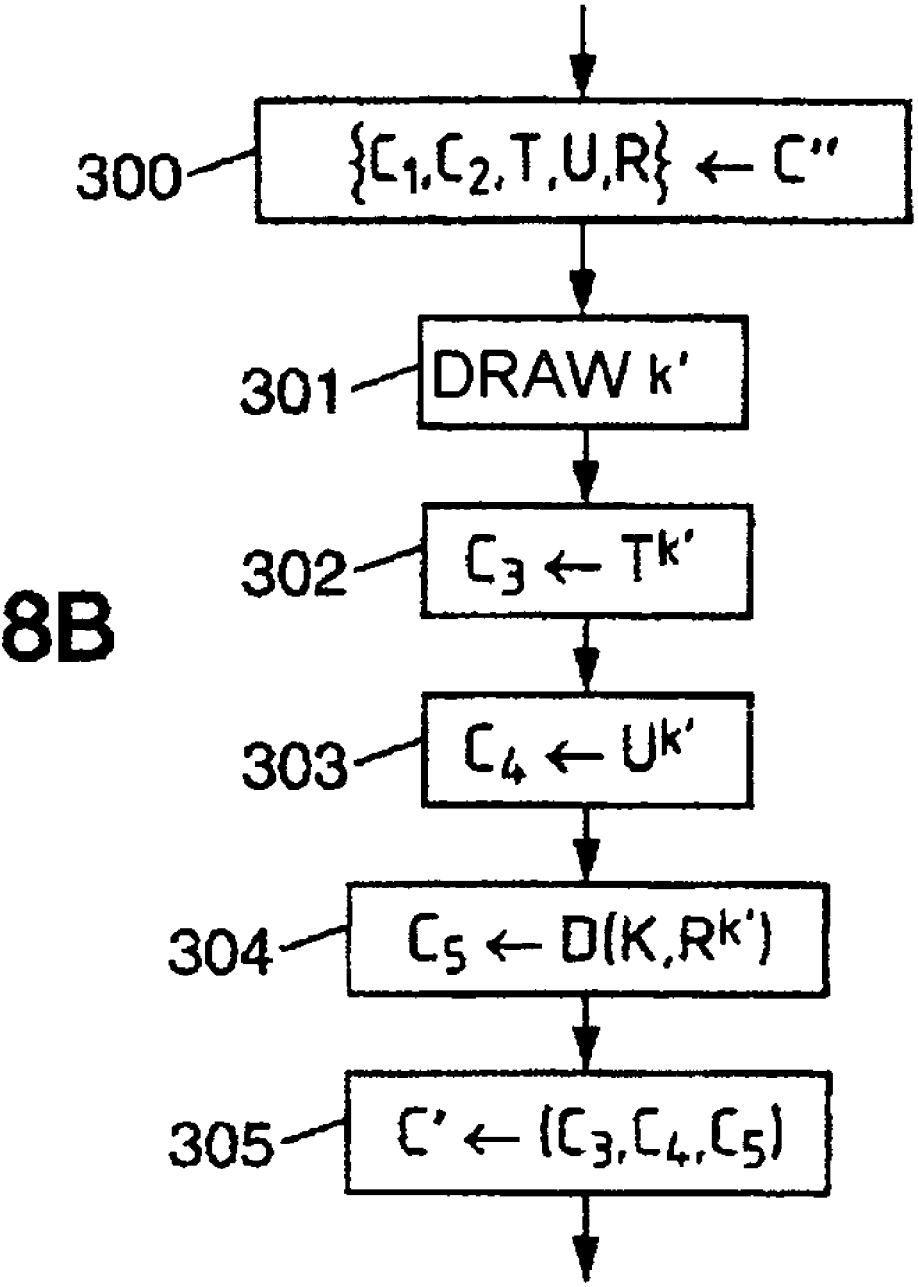

The operation of the module 13" is illustrated by FIG. 8B. In step 300, it recovers the five components of the public key C" supplied by the entity 3, marked $C_1$, $C_2$, T (=$C_3$ in FIG. 8A), U (=$C_4$ in FIG. 8A) and R. A random number k' is drawn between 1 and p−1 in step 301 for the computation of $C_3$=$T^{k'}$ in step 302 and of $C_4$=$U^{k'}$ in step 303. In step 304, a new masking value $R^{k'}$ is computed and then combined with the session key K supplied by the generator 12 by means of the bilinear application in order to form the component $C_5$=D(R, $R^{k'}$). The cryptogram C' may then be assembled in step 305 in order to make the components $C_1$-$C_5$ available to the decoders 2. As shown in FIG. 8B, the cryptogram C' delivered by the second entity 4 may in this case include only the components $C_3$-$C_5$ because the components $C_1$ and $C_2$ already form part of the public key C" which the decoders have been able to receive by other channels.

In the public key architecture, the decoders 2 may be the same as those described above since the components $C_1$-$C_5$ are the same as those computed by the entity 1 of FIG. 1 (if k·k' modulo p is taken as the value of k in FIG. 3).

The public key architecture is compatible with the various alternatives of the method that have been mentioned above, an exponent k' being simply useful for the operation of the entity 4 which proceeds with the encryption of the keys K.

Other embodiments of the method according to the invention make it possible, as necessary, to simultaneously revoke the decryption keys of several users. For example, if several variable elements $s_1$, ... $s_m$ of the same type as s in the algorithm described with reference to FIG. 3, 5 or 8A are incorporated in the component $C_2$ of the cryptogram and combined with γ to generate the components $C_1$ and $C_4$ (m>1), the system manager can revoke up to m keys simultaneously by assigning to one of the elements $s_i$ the index x' of one of the keys to be revoked (1≦i≦m). One possibility is to replace $C_1$ with $h_1^{1/[(\gamma+s_1)\times(\gamma+s_2)\times \ldots \times(\gamma+s_m)]}$ or by the m-uplet of the $h_1^{1/(\gamma+s_i)}$ and $C_4$ by $h_2^{k/[(\gamma+s_1)\times(\gamma+s_2)\times \ldots \times(\gamma+s_m)]}$ or by the m-uplet of the $h_2^{k/(\gamma+s_i)}$. A decoder must then compute the value $B^{1/[(\gamma+s_1)\times(\gamma+s_2)\times \ldots \times(\gamma+s_m)]}$ in order to be able to decrypt such a cryptogram.

In the context in particular of such an embodiment, it is possible to arrange that the updating of the parameters $h_1$ and $h_2$ by the entity 1, 3 and B by the decoders 2 does not occur during each decryption key revocation operation. So long as the number q of the decryption keys revoked since the last update of these parameters remains less than m, it is possible to continue to encrypt data K without carrying out a new update and while conserving the variability of at least one of the elements $s_i$, taking care to keep the indices $x'_1$, ... , $x'_q$ of the revoked keys as values of q of the m elements $s_1$, ... , $s_m$. Each decoder furnished with one of these q keys is then unable to decrypt. When a new update of the parameters is finally carried out, these q decoders will lose the parameters necessary for decryption and it will again become possible to revoke additional keys. Such an updating of the parameters may be carried out at a predetermined frequency or on occasions signaled by the transmitting entity 1, 3.

An advantage of this type of embodiment is that it makes management of any disconnections of the legitimate decoders easy. In general, following such a disconnection, a decoder 2 must be resynchronized by retrieving from the entity 1, 3 parameters making it possible to update its decryption key. During the reconnection, if the decoder 2 ascertains that it does not manage to correctly decrypt the cryptograms C, C', an exchange occurs during which the decoder 2 indicates to the entity 1, 3 when it disconnected and the entity 1, 3 returns the components $C_1$ and $C_2$ of the cryptograms C' that were sent during the parameter updates that occurred during the disconnection period. The decoder 2 may then carry out the successive updates that it missed (computations 201, 205 of FIG. 4 or 6) and resume decryption of the keys and of the broadcast content. In addition to the signaling load, this means that the decoders 2 store the instants when they disconnect and that the entity 1, 3 keeps in memory a history of certain components of the cryptograms C' transmitted during the parameter updates. By reducing the frequency of parameter updates relative to that of the key revocations, the user reduces the probability that a decoder needs to be resynchronized and this therefore reduces the required exchanges. In addition, it reduces the quantity of information that has to be conserved as a history at the entity 1, 3 in order to carry out the resynchronizations that may remain.

The devices represented in FIGS. 1, 2, 7A and 7B may be embodied by means of specific circuits or programmed logic components of the FPGA type or similar type. A typical embodiment will however use general-purpose processors running programs according to the invention, written so as to apply, for example, one of the procedures previously described with reference to FIGS. 2-6, 8A and 8B.

The invention claimed is:

1. A cryptographic method, wherein a first entity has a secret encryption key of an encryption scheme accepting a plurality of decryption keys, and a plurality of receiving entities have respective decryption keys, each decryption key incorporating a respective key index, the method comprising an encryption operation including the steps of:
   assigning a value to at least one variable element; and
   computing, using a processor selected between a general-purpose processor, a specific circuit and a programmed logic component, a cryptogram from data to be transmitted, at least each variable element value and the secret encryption key,
   the method further comprising a revocation operation for at least one decryption key, the revocation operation being incorporated in an encryption operation carried out by assigning to said at least one variable element a value depending on the key index of one of said decryption keys, wherein the secret encryption key includes an element $g_1$ of a cyclic group $G_1$ of order p and an integer $\gamma$ chosen between 1 and p−1, where p is a prime number,
   wherein the secret encryption key is associated with a public key w of a cyclic group $G_2$ of order p, in the form $w=g_2^\gamma$, where $g_2$ is an element of group $G_2$, and
   wherein each decryption key having an integer index x lying between 1 and p−1 includes two elements $A=g_1^{1/(\gamma+x)}$ and $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

2. The cryptographic method as claimed in claim 1, wherein the cryptogram has portions representative:
   of the element $C_1=h_1^{1/(\gamma+s)}$ of group $G_1$, where s is the value assigned to a variable element, taken as an integer lying between 1 and p−1;
   of the value $C_2=s$ of said variable element;
   of the element $C_3=w^k$ of group $G_2$, where k is an integer lying between 1 and p−1;
   of the element $C_4=h_2^{k/(\gamma \pm s)}$ of group $G_2$, $h_2$ being a generator element of group $G_2$ such that $g_2=h_2^\alpha$; and
   of a value $C_5$ derived from the data to be transmitted (K) and from a masking value (R) obtained by subjecting the elements $g_1$ and $C_4$ of groups $G_1$ and $G_2$ to a bilinear application, and
   wherein at least one revocation operation includes, after computation of element $C_1$ with the value s of said variable element equal to the index x' of the revoked decryption key, replacing said element $h_1$ of group $G_1$ by $h_1^{1/(\gamma+x')}$ and, after computation of element $C_4$ with the value s of said variable element equal to the index x' of the revoked decryption key, replacing said element $h_2$ of group $G_2$ by $h_2^{1/(\gamma+x')}$ for computation of the cryptogram in a subsequent encryption operation.

3. The cryptographic method as claimed in claim 2, further comprising an operation of decryption of the cryptogram in order to recover the data to be transmitted at a receiving entity having a decryption key {A, B, x}, the decryption operation including computing an element $Y=(C_1/B)^{1/(x-C_2)}$ of group $G_1$, computing a first value by subjecting the elements Y and $C_3$ of groups $G_1$ and $G_2$ to the bilinear application, computing a second value by subjecting the elements $A^x$ and $C_4$ of groups $G_1$ and $G_2$ to the bilinear application, computing a third value, representative of the masking value, equal to the product of said first and second values, and recovering the data to be transmitted from the value $C_5$ and said third value.

4. The cryptographic method as claimed in claim 3, wherein at least one decryption operation further comprises, after a revocation operation, replacing element B of the decryption key {A, B, x} of the receiving entity by said element Y computed during said decryption operation.

5. The cryptographic method as claimed in claim 1, wherein the computation of the cryptogram in the encryption operation comprises:
   a first portion executed by the first entity in order to produce a public encryption key from at least said value of the variable element and the secret encryption key, and
   at least one occurrence of a second portion executed by another entity in order to produce the cryptogram from the data to be transmitted, the public encryption key and at least one number drawn randomly on each occurrence.

6. The cryptographic method as claimed in claim 1, wherein the cryptogram has a size that is constant and independent of the number of receiving entities.

7. The cryptographic method as claimed in claim 1, wherein, every N encryption operations, the encryption operation includes a decryption key revocation operation, N being an integer greater than or equal to 1.

8. The cryptographic method as claimed in claim 1, wherein the revocation operation further includes updating at least one parameter involved in the computation of the cryptogram for a subsequent encryption operation.

9. The cryptographic method as claimed in claim 1, further comprising an operation of decryption of the cryptogram in order to recover the data to be transmitted at a receiving entity.

10. The cryptographic method as claimed in claim 1, wherein, after the revocation operation, a decryption operation further includes an update of at least one element of the decryption key of the receiving entity.

11. An encryption system comprising:
a memory containing a secret encryption key of an encryption scheme accepting a plurality of respective decryption keys, each decryption key incorporating a respective key index; and
a computer arranged to assign a value to at least one variable element in an encryption operation and to produce a masking value (R) from at least each variable element value and the secret encryption key, at least some of the encryption operations including an operation to revoke at least one decryption key,
the computer, during the encryption operation including a decryption key revocation operation, to assign to a variable element a value that is a function of the key index of one of said decryption keys, wherein at least some of the revocation operations further include updating at least one parameter involved in the computation of the masking value for a subsequent encryption operation, wherein the secret encryption key includes an element $g_1$ of a cyclic group $G_1$ of order p and an integer $\gamma$ chosen between 1 and p−1, where p is a prime number, wherein the secret encryption key is associated with a public key w of a cyclic group $G_2$ of order p, in the form $w=g_1^\gamma$, where $g_2$ is an element of group $G_2$, and wherein each decryption key having an integer index x lying between 1 and p−1 includes two elements $A=g_1^{1/(\gamma+x)}$ and $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

12. The encryption system as claimed in claim 11, wherein the computer is arranged to produce:
an element $C_1=h_1^{1/(\gamma+s)}$ of group $G_1$, where s is the value assigned to a variable element, taken as an integer lying between 1 and p−1;
the value $C_2=s$ of said variable element;
an element $C_3=w^k$ of group $G_2$, where k is an integer lying between 1 and p−1; and
an element $C_4=h_2^{k/(\gamma+s)}$ of group $G_2$, $h_2$ being a generator element of group $G_2$ such that $g_2=h_2^\alpha$,
wherein the masking value is obtained by subjecting the elements $g_1$ and $C_4$ of groups $G_1$ and $G_2$ to a bilinear application, and
wherein at least one revocation operation includes, after computation of element $C_1$ with the value s of said variable element equal to the index x' of the revoked decryption key, replacing said element $h_1$ of group $G_1$ by $h_1^{1/(\gamma+x')}$ and, after computation of element $C_4$ with the value s of said variable element equal to the index x' of the revoked decryption key, replacing said element $h_2$ of group $G_2$ by $h_2^{1/(\gamma+x')}$ for computation of the cryptogram in a subsequent encryption operation.

13. The encryption system as claimed in claim 11, wherein the computer is arranged to produce:
an element $C_1=h_1^{1/(\gamma+s)}$ of group $G_1$, where s is the value assigned to a variable element, taken as an integer lying between 1 and p−1;
the value $C_2=s$ of said variable element; and
an element $C_4=h_2^{1/(\gamma+s)}$ of group $G_2$, $h_2$ being a generator element of group $G_2$ such that $g_2=h_2^\alpha$,
wherein the masking value is obtained by subjecting the elements $g_1$ and $C_4$ of groups $G_1$ and $G_2$ to a bilinear application, and
wherein at least one revocation operation includes, after computation of element $C_1$ with the value s of said variable element equal to the index x' of the revoked decryption key, replacing said element $h_1$ of group $G_1$ by $h_1^{1/(\gamma+x')}$ and, after computation of element $C_4$ with the value s of said variable element equal to the index x' of the revoked decryption key, replacing said element $h_2$ of group $G_2$ by $h_2^{1/(\gamma+x')}$ for computation of the cryptogram in a subsequent encryption operation.

14. The encryption system as claimed in claim 11, wherein group $G_2$ coincides with group $G_1$ and elements $h_1$ and $h_2$ are equal.

15. The encryption system as claimed in claim 11, comprising:
a first entity incorporating said computer and arranged to transmit, as a public encryption key, data including the masking value; and
another entity having another computer to produce a cryptogram from data to be transmitted, the public encryption key and at least one randomly drawn number.

16. A computer program product for an encryption system, wherein the system has a first entity holding secret encryption key of an encryption scheme accepting a plurality of decryption keys, and a plurality of receiving entities holding respective decryption keys, each decryption key incorporating a respective key index, the program product comprising a non-transitory computer readable medium, having thereon a computer program comprising program instructions to carry out encryption operations upon execution of the program product by a processor unit of the encryption system, wherein each encryption operation includes the steps of:
assigning a value to at least one variable element; and
computing a cryptogram from data to be transmitted, at least each variable element value and the secret encryption key, and
wherein at least some of the encryption operations include a revocation operation for at least one decryption key, the revocation operation being incorporated in an encryption operation carried out by assigning to said at least one variable element a value depending on the key index of one of said decryption keys, wherein at least certain of the revocation operations further include updating at least one parameter involved in the computation of the cryptogram for a subsequent encryption operation, wherein the secret encryption key includes an element $g_1$ of a cyclic group $G_1$ of order p and an integer $\gamma$ chosen between 1 and p−1, where p is a prime number, wherein the secret encryption key is associated with a public key w of a cyclic group $G_2$ of order p, in the form $w=g_1^\gamma$, where $g_2$ is an element of group $G_2$, and wherein each decryption key having an integer index x lying between 1 and p−1 includes two elements $A=g_1^{1/(\gamma+x)}$ and $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

17. A tracing device for examining a pirate decoder, the device comprising an interface for communication with the pirate decoder, an encryption system arranged to deliver to the pirate decoder, through the communication interface, cryptograms produced in successive encryption operations and means for observing a behavior of the pirate decoder in response to the successive cryptograms, the encryption system comprising:
a memory containing a secret encryption key of an encryption scheme accepting a plurality of respective decryption keys, each decryption key incorporating a respective key index; and
a computer arranged to assign a value to at least one variable element in an encryption operation and to produce a masking value from at least each variable element value and the secret encryption key, at least some of the encryption operations including an operation to revoke at least one decryption key allocated to a decoder, the computer, during the encryption operation including a decryption key revocation operation, to assign to a variable element a value that is a function of the key index of one of said decryption keys, wherein at least some of the revocation operations further include updating at least one parameter involved in the computation of the masking value for a subsequent encryption operation, wherein the secret encryption key includes an element $g_1$ of a cyclic group $G_1$ of order p and an integer y chosen between 1 and p−1, where p is a prime number, wherein the secret encryption key is associated with a public key w of a cyclic group $G_2$ of order p, in the form $w=g_1^\gamma$, where $g_2$ is an element of group $G_2$, and wherein each decryption $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

18. A decryption device, comprising:

a memory containing a decryption key of an encryption scheme accepting a plurality of decryption keys associated with one and the same secret encryption key, each decryption key incorporating a respective key index; and a computer configured to receive a cryptogram generated in an encryption operation from data to be transmitted, at least one value assigned to at least one variable element and the secret encryption key and to restore said data with the aid of the decryption key contained in said memory, wherein the computer is arranged to update, by an element computed during the decryption operation, at least one element of the decryption key contained in the memory after an operation of revocation of the decryption key incorporated in an encryption operation carried out by assigning to a variable element a value that is a function of the index of the key of one of the decryption keys, wherein recovery of the data and update of the element of the decryption key are prevented when the index of the key as a function of which the value of the variable element is taken in the revocation operation coincides with the index of the decryption key contained in the memory.

19. The decryption device as claimed in claim 18, wherein the secret encryption key includes an element $g_1$ of a cyclic group $G_1$ of order p and an integer $\gamma$ chosen between 1 and p−1, where p is a prime number, wherein the secret encryption key is associated with a public key w of a cyclic group $G_2$ of order p, in the form $w=g_2^\gamma$, where $g_2$ is an element of the group $G_2$, and wherein each decryption key having an integer index x lying between 1 and p−1 includes two elements $A=g_1^{1/(\gamma+x)}$ and $B=h_1^{1/(\gamma+x)}$ of group $G_1$, $h_1$ being a generator element of group $G_1$ such that $g_1=h_1^\alpha$ where $\alpha$ is an integer exponent lying between 1 and p−1.

20. A computer program product for a decryption device, the program comprising a non-transitory computer readable medium, having thereon a computer program comprising program instructions to carry out decryption operations upon execution of the program product by a processor unit of the device, wherein the device stores a decryption key of an encryption scheme accepting a plurality of decryption keys associated with one and the same secret encryption key, each decryption key incorporating a respective key index, wherein each decryption operation comprises:

receiving a cryptogram generated in an encryption operation from data to be transmitted, at least one value assigned to at least one variable element and the secret encryption key; and recovering said data with the aid of the decryption key contained in said memory, wherein the program product further comprises instructions to cause the computer to update, by an element computed during the decryption operation, at least one element of the stored decryption key after ran operation of revocation of the decryption key incorporated in an encryption operation carried out by assigning to a variable element a value that is a function of the index of the key of one of the decryption keys, wherein recovery of the data and update of the element of the decryption key are prevented when the index of the key as a function of which the value of the variable element is taken in the revocation operation coincides with the index of the stored decryption key.

* * * * *